(12) United States Patent
Jee

(10) Patent No.: US 9,840,829 B2
(45) Date of Patent: Dec. 12, 2017

(54) FLEX PIN

(71) Applicant: SRJ, Inc., Schaumburg, IL (US)

(72) Inventor: Woo Young Jee, Inverness, IL (US)

(73) Assignee: SRJ, Inc., Schaumburg, IL (US)

( * ) Notice: Subject to any disclaimer, the term of this patent is extended or adjusted under 35 U.S.C. 154(b) by 49 days.

(21) Appl. No.: 14/955,398

(22) Filed: Dec. 1, 2015

(65) Prior Publication Data

US 2017/0152647 A1 Jun. 1, 2017

(51) Int. Cl.
| | |
|---|---|
| *E02F 9/28* | (2006.01) |
| *B29C 65/48* | (2006.01) |
| *B22D 25/02* | (2006.01) |
| *B29K 9/06* | (2006.01) |
| *B29L 31/00* | (2006.01) |

(52) U.S. Cl.
CPC ............ *E02F 9/2833* (2013.01); *B22D 25/02* (2013.01); *B29C 65/48* (2013.01); *E02F 9/285* (2013.01); *E02F 9/2816* (2013.01); *B29K 2009/06* (2013.01); *B29L 2031/00* (2013.01)

(58) Field of Classification Search
CPC ...... E02F 9/2833; E02F 9/2841; E02F 9/2858
USPC .................................................. 411/351, 356
See application file for complete search history.

(56) References Cited

U.S. PATENT DOCUMENTS

| | | | |
|---|---|---|---|
| 2,798,403 A | 7/1957 | Launder | |
| 2,991,569 A * | 7/1961 | Launder | ................ E02F 9/2841 37/457 |
| 3,437,003 A | 4/1969 | Rhoads | |
| 3,468,210 A | 9/1969 | Watts | |
| 3,520,224 A | 7/1970 | Hensley et al. | |
| 3,704,753 A | 12/1972 | Hasforth et al. | |
| 3,879,867 A | 4/1975 | Ericson et al. | |
| 4,077,729 A * | 3/1978 | Schwappach | ......... E02F 9/2841 37/328 |
| 4,129,934 A | 12/1978 | Gettman | |
| 4,579,494 A | 4/1986 | Bierwith | |
| 4,823,487 A | 4/1989 | Robinson | |
| 5,394,629 A | 3/1995 | Ruvang et al. | |
| 5,469,648 A | 11/1995 | Jones et al. | |
| 5,617,655 A | 4/1997 | Launder et al. | |
| 5,802,752 A | 9/1998 | Quarfordt | |
| 6,030,143 A | 2/2000 | Kreitzberg | |

(Continued)

FOREIGN PATENT DOCUMENTS

| | | | | |
|---|---|---|---|---|
| CA | 2538123 C | * | 2/2010 | ............ E02F 9/2841 |
| GB | 1332323 A | * | 10/1973 | ............ E02F 9/2841 |

(Continued)

OTHER PUBLICATIONS

International Search Report and Written Opinion of International Application No. PCT/US2016/062058, dated Feb. 24, 2017, 17 pp.

(Continued)

*Primary Examiner* — Matthew D. Troutman
(74) *Attorney, Agent, or Firm* — Shumaker & Sieffert, P.A.

(57) ABSTRACT

A flex pin includes a compressible member disposed between first and second rigid members configured to be installed in a tooth and shank assembly. The first rigid member includes a locking recess defined by a front wall, a locking major surface, and a back gradation defining at least one step. At least one of the first or second rigid members includes a bonding recess configured to receive a portion of the compressible member.

20 Claims, 7 Drawing Sheets

(56) References Cited

U.S. PATENT DOCUMENTS

| | | |
|---|---|---|
| 6,385,871 B1 | 5/2002 | Quarfordt |
| 2008/0201997 A1 | 8/2008 | Armstrong |
| 2008/0256832 A1* | 10/2008 | Esti ..................... E02F 9/2825 37/456 |

FOREIGN PATENT DOCUMENTS

| | | | |
|---|---|---|---|
| GB | 1549248 A * | 8/1979 | ............ E02F 9/2841 |
| IT | EP 0531603 A1 * | 3/1993 | ............ E02F 9/2825 |
| IT | EP 2378010 A2 * | 10/2011 | ............ E02F 9/2825 |
| WO | 2011088506 A1 | 7/2011 | |
| WO | WO 2014186233 A1 * | 11/2014 | ............ E02F 9/2825 |

OTHER PUBLICATIONS

Part Specification List for the "230 Series Deltawing Tooth System," 909 230DFP, retrieved from http://www.colemanequip.com/specsheets/parts/909_230DFP.pdf, Aug. 22, 2015, 1 pp.

"Ningbo Fancheng Machinery Parts Manufacturer", China Super V Esco Bucket Teeth, retrieved from http://excavator-sparepart.worldinmfg.com/, Sep. 8, 2015, 4 pp.

Everychina, "Ningbo Fancheng Machinery Parts Manufacturer," Combi Bucket Teeth Pins, retrieved from http://excavatorsparepart.sell.everychina.com, Sep. 8, 2015, 2 pp.

"X 330 Bucket Tooth with P330 Flex Pin," x330 hensley bucket tooth, retrieved from Bucket-Teeth.Biz, Sep. 8, 2015, 1 pp.

Written Opinion dated Feb. 24, 2017, from International Application No. PCT/US2016/062058, filed on Sep. 12, 2017, 17 pp.

\* cited by examiner

FLEX PIN

TECHNICAL FIELD

The disclosure relates to a flex pin.

BACKGROUND

Many earthmoving vehicles (e.g., excavators, skid steer track loaders, multi-terrain track loaders, agricultural vehicles, or the like) may include buckets or blades designed for moving or excavating soil or other materials. In some examples, the buckets or blades of the earthmoving vehicles may include a plurality of teeth positioned along the edge of the bucket or blade designed for assisting with the excavating process. Each tooth may be attached to a shank fixed to the bucket or blade using a flex pin.

SUMMARY

The present disclosure describes example flex pins, which may be used, for example, to secure a tooth and shank assembly for a bucket or blade of an earthmoving vehicle. In addition, the present disclosure describes example methods of using the flex pins and example methods of forming the flex pins.

In some examples, the disclosure describes a flex pin that includes a first rigid member including a first elongated body extending along a central axis of the flex pin from a first forward end to a first back end, where the first elongated body defines a first bonding surface and a first outer surface including a locking recess, where the locking recess extends laterally along the first elongated body between the first forward end and the first back end, where the locking recess includes a major surface substantially parallel to the central axis, a forward wall substantially perpendicular to the central axis and adjacent to the first forward end, and a back gradation having at least one step between the major surface of the locking recess and the first outer surface, where the first forward end defines a first tapered tip. The flex pin may also include a second rigid member including a second elongated body extending along the central axis from a second forward end to a second back end, where the second elongated body defines a second outer surface and a second bonding surface, where the second forward end defines a second tapered tip. The flex pin may also include a compressible member disposed between the first rigid member and the second rigid member, where the compressible member is connected to the first bonding surface and the second bonding surface, and where at least one of the first bonding surface or the second bonding surface defines a bonding recess configured to receive a portion of the compressible member.

In some examples, the disclosure describes a method of forming a flex pin that includes forming a first rigid member, where the first rigid member comprises a first elongated body extending along a central axis of the flex pin from a first forward end to a first back end, where the first elongated body defines a first bonding surface and a first outer surface including a locking recess, where the locking recess extends laterally along the first elongated body between the first forward end and the first back end, where the locking recess comprises a major surface substantially parallel to the central axis, a forward wall substantially perpendicular to the central axis and adjacent to the first forward end, and a back gradation having at least one step between the major surface of the locking recess and the first outer surface, where the first forward end defines a first tapered tip. The method may also include forming a second rigid member, where the second rigid member includes a second elongated body extending along the central axis from a second forward end to a second back end, where the second elongated body defines a second outer surface and a second bonding surface, where the second forward end defines a second tapered tip. The method may also include depositing a compressible member between the first rigid member and the second rigid member, where depositing the compressible member includes depositing a portion of the compressible member into a bonding recess defined by at least one of the first bonding surface or the second bonding surface, where the compressible member is connected to the first bonding surface and the second bonding surface.

The details of one or more examples of the disclosure are set forth in the accompanying drawings and the description below. Other features, objects, and advantages of the disclosure will be apparent from the description and drawings, and from the claims.

DETAILED DESCRIPTION

The present disclosure describes flex pins configured to secure a tooth and shank assembly for a bucket or blade of an earthmoving vehicle. In some examples, the flex pins of the present disclosure may provide an increased resistance against the flex pin becoming unintentionally dislodged from the tooth and shank assembly during operation of the vehicle compared to other designs. While the flex pins of the present disclosure are described below in the reference to a securement device for a tooth and shank assembly of an earthmoving vehicle, the flex pins of the present disclosure may be used for other applications or other devices.

Figure 1:
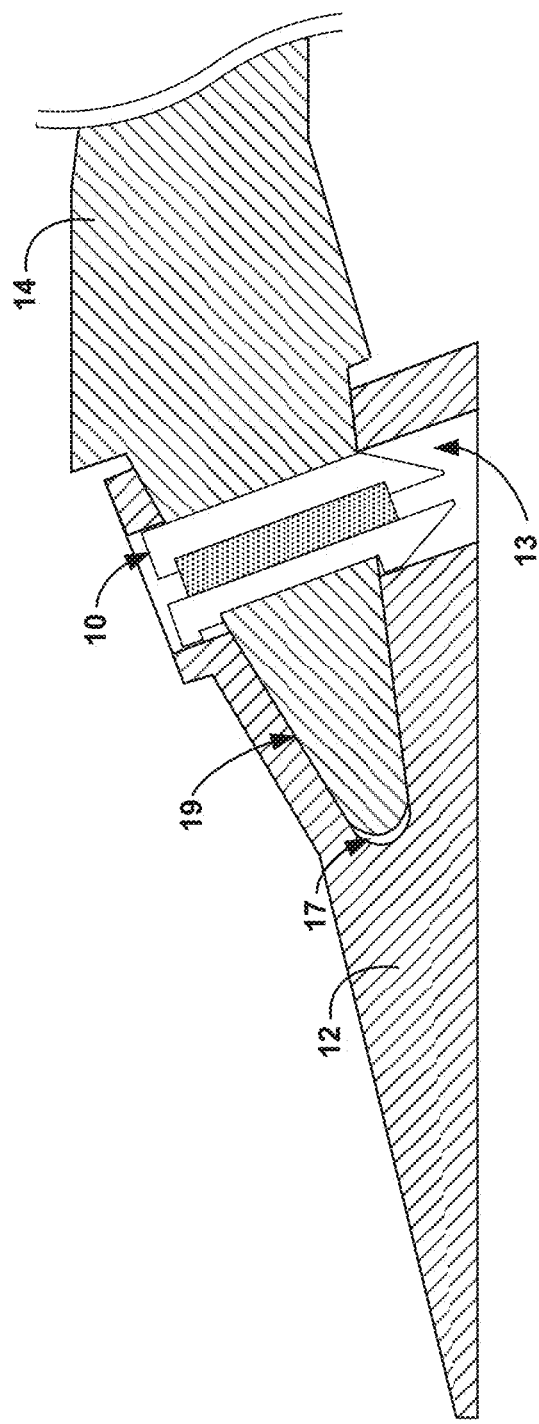
FIG. 1 is a conceptual cross-sectional view schematic of an assembly including an example flex pin that secures a tooth to a corresponding shank of a bucket for an earth moving vehicle.

FIG. 1 is a conceptual cross-sectional view illustrating an example flex pin 10 used to attach a tooth 12 to a corresponding shank 14 of a bucket for an earth moving vehicle (not shown). Tooth 12 may include a replaceable tooth for an earthmoving vehicle including, for example, excavators, skid steer track loaders, backhoes, multi-terrain track loaders, agricultural vehicles, or the like. In some examples tooth 12 may be configured to receive a portion of shank 14. For example, as shown in FIG. 1, tooth 12 may include a cupped section 17 configured to receive a tapered portion 19 of shank 14. Tooth 12 and shank 14 may each include corresponding bore holes 13 that substantially align (e.g., align or overlap enough to permit flex pin 10 to extend through the bore holes 13) when tooth 12 and shank 14 are assembled. Flex pin 10 may be inserted into corresponding bore holes 13 of tooth 12 and shank 14 to help retain and secure tooth 12 to shaft 14 during operation of the vehicle. In some examples, the bore hole 13 of tooth 12 may be slightly larger than the bore hole of shank 14 to allow for a portion of shank 14 to be received in a locking recess of flex pin 10 as describe further below.

In some examples, the earthmoving vehicle may include a bucket assembly including a plurality of shanks (e.g., shank 14) attached to a digging edge of the bucket and respective teeth (e.g., tooth 12) each attached to a respective shank using a flex pin 10. While FIG. 1 illustrates flex pin 10 installed in a vertical position in tooth 12 and shank 14 (e.g., where the central axis 16 of flex pin 10 is mounted in a direction substantially perpendicular to the digging edge of the bucket), in some examples, flex pin 10 may be installed in other configurations including, for example, a horizontal configuration (e.g., where the central axis 16 of flex pin 10 is mounted in a direction substantially parallel to the digging edge of the bucket).

Figure 2:
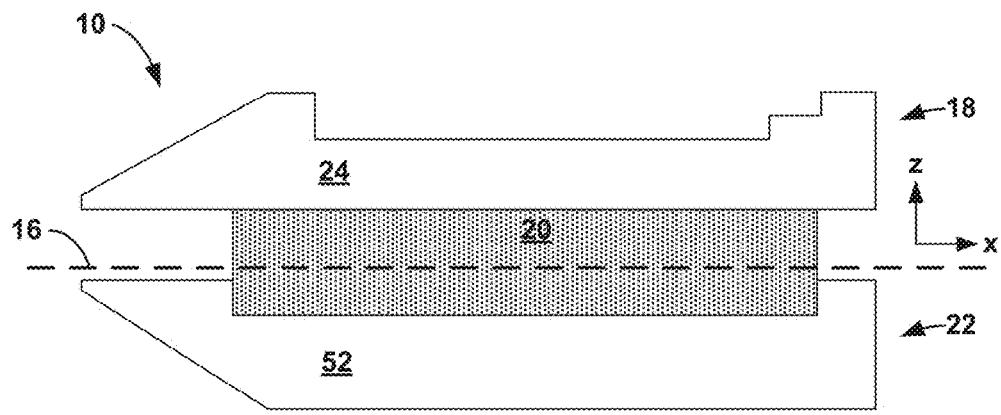
FIG. 2 is a conceptual side view schematic illustrating an example flex pin.
Figure 3:
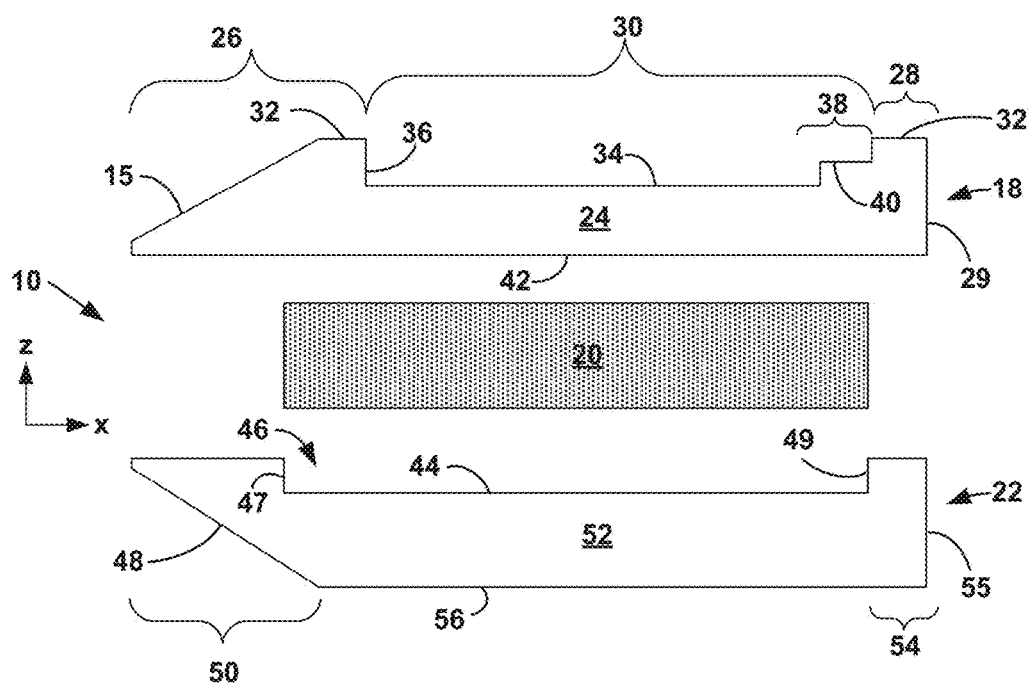
FIG. 3 is a conceptual side-exploded view schematic of the flex pin of FIG. 2.

FIGS. 2 and 3 are a conceptual side view (FIG. 2) and side-exploded view (FIG. 3) illustrating example flex pin 10. Flex pin 10 may include a first rigid member 18, a second rigid member 22, and a compressible member 20 disposed between and connected to the first and second rigid members 18 and 22. The assembled flex pin 10 may define a central axis 16 extending lengthwise through the flex pin (e.g., in the x-axis direction of FIG. 2) to define the major axis of flex pin 10.

In some examples, first rigid member 18 of flex pin 10 may include a first elongated body 24 that extends from a first forward end 26 to a first back end 28 along central axis 16. First elongated body 24 may define a first outer surface 32 and a first bonding surface 42. First outer surface 32 may include a locking recess 30 that extends laterally along first elongated body 24 between first forward 26 and first back end 28 (e.g., in the x-axis direction of FIG. 2). In some examples, locking recess 30 may include a locking major surface 34 that is substantially parallel (e.g., parallel or nearly parallel) to central axis 16, locking major surface 34 being configured to contact a portion or shank 14 or tooth 12 when flex pin 10 is installed and seated in a "locked" position (e.g., FIG. 1). Locking recess 30 may also include a forward wall 36 that is substantially perpendicular (e.g., perpendicular or nearly perpendicular) to central axis 16 and positioned adjacent to first forward end 26. Locking recess 30 may also include a back gradation 38 (e.g., a stepped transition section) that includes a least one step 40 that defines a segmented transition between locking major surface 34 and first outer surface 32.

In some examples, locking recess 30 may be configured to physically engage with tooth 12 and shank 14 when flex pin 10 is installed to secure flex pin 10 in bore holes 13 and help inhibit flex pin 10 from becoming unintentionally dislodged from bore holes 13 (e.g., ejecting during operation). For example, as shown in FIG. 1, when flex pin 10 may be inserted in bore holes 13 into a "locked" position where a portion of shank 14 may be received and seated in locking recess 30 such that the portion of shank 14 may contact locking major surface 34 and set between forward wall 36 and back gradation 38. In some examples, the diameter of flex pin 10, as discussed further below, may be sized larger than bore holes 13 so that compressible member 20 remains slightly compressed when flex pin 10 is installed, thereby providing some retention force (e.g., force in the perpendicular a direction to central axis 16) to help retain the portion of shank 14 in locking recess 30 and to help inhibit flex pin 10 from becoming unintentionally dislodged from bore holes 13 (e.g., ejected in a direction parallel to central axis 16) during operation of the earthmoving vehicle.

In some examples, forward wall 36 may be designed to help inhibit flex pin 10 from being unintentionally dislodged from bore holes 13 (e.g., ejecting during operation). For example, forward wall by be formed to be substantially perpendicular to central axis 16 (e.g., perpendicular or nearly perpendicular) to provide a substantially perpendicular contact surface for receiving shank 14 that may inhibit the ability of shank 14 from becoming dislodged from locking recess 30 during operation (e.g., ejected in the x-axis direction of FIG. 2) compared to other designs where forward wall 36 may be tapered or sub-perpendicular (e.g., 60° to locking major surface 34 and central axis 16).

Second rigid member 22 of flex pin 10 may include a second elongated body 52 that extends along central axis 16 from a second forward end 50 to a second back end 54. Elongated body 52 may define a second outer surface 56 and a second bonding surface 44. In some examples, first outer surface 32 and second outer surface 56 may be curved (e.g., curved in a radial direction of central axis 16) such that flex pin 10 exhibits a semi-cylindrical (e.g., elliptical-cylindrical) shape configured to be inserted in bore holes 13 of tooth 12 and shank 14.

In some examples, first forward end 26 and second forward end 50 may define respective tapered tips 15 and 48. During the insertion of flex pin 10 into bore holes 13 during installation, tapered tips 15 and 48 may allow flex pin 10 to be slidably advanced into the "locked" position. In this way, tapered tips 15 and 48 may improve the ease with which flex pin 10 may be installed in bore holes 13.

In some examples, first back end 28 and second back end 54 may include a first driving surface 29 and a second driving surface 55 respectively. First and second driving surfaces 29 and 55 may be configured to provide a relatively blunt surface compared to tapered tips 15 and 48 that may be used to engage a tool that applies a driving force (e.g., press, hammer, punch, or the like) to insert flex pin 10 into bore holes 13. In some examples, first and second driving surfaces 29 and 55 may be substantially perpendicular (e.g., perpendicular or nearly perpendicular) to central axis 16.

First rigid member 18 and second rigid member 22 may be made using any suitable material sufficiently rigid so that first rigid member 18 and second rigid member 22 sufficiently retain their respective shapes during routine operation of the earthmoving vehicle. For example, first rigid member 18 and second rigid member 22 may be constructed to include a metal or metal alloy material including, for example, AISI 1045 carbon steel. In some examples, first rigid member 18 and second rigid member 22 may be formed by metal casting and/or machining techniques to form the various geometric features described herein.

Compressible member 20 may be disposed between first rigid member 18 and second rigid member 22 such that compressible member 20 connects to first bonding surface 42 and second bonding surface 44. Compressible member 20 may include any suitable material configured to permit flex pin 10 to be compressed (e.g., in the z-axis direction of FIG. 2) and inserted in bore holes 13 while also allowing flex pin 10 to return to a non-compressed state once flex pin 10 is inserted and seated in the "locked" position in bore holes 13 (e.g., FIG. 1). In some examples, compressible member 20 may include one or more resilient polymer materials including, for example, specially formulated rubbers such as styrene-butadiene rubber (SBR).

In some examples first bonding surface 42 and second bonding surface 44 may be substantially planar (e.g., planar or nearly planar) and positioned substantially parallel (e.g. parallel or nearly parallel) to one another to receive compressible member 20. In some examples, second bonding surface 44 defines bonding recess 46 configured to receive part of compressible member 20. In some examples, bonding recess 46 may be rectangular shaped (or another suitable shape) and include front and rear retaining walls 47 and 49, respectively. The front and rear retaining walls 47 and 49 may be positioned perpendicular (e.g., perpendicular or nearly perpendicular) to central axis 16 and substantially parallel (e.g., parallel or nearly parallel) to one another. Bonding recess 46 and compressible member 20 may be sized such that compressible member 20 may be deposited in bonding recess 46 between front and rear retaining walls 47 and 49.

In some examples, front and rear retaining walls 47 and 49 may inhibit lateral movement (e.g., movement along central axis 16) of compressible member 20. Such configurations may help inhibit flex pin 10 from becoming unintentionally dislodged during operation. For example, as flex pin 10 becomes compressed in the z-axis direction of FIG. 2, compressible member 20 may be elastically deformed such that compressible member budges or protrudes laterally (e.g., expand parallel to central axis 16), causing the tensile strength of compressible member 20 to be diminished. The presence of front and rear retaining walls 47 and 49 may inhibit the deformation of compressible member 20, which may increase the resilience (e.g., tensile strength) of compressible member 20 and help to retain flex pin 10 in the "locked" position in bore holes 13 (e.g., FIG. 1) while still permitting some degree of deformation of compressible member 20 (e.g., in the z-axis direction of FIG. 2) during the installation and removal of flex pin 10 (e.g., FIGS. 6A, 6C, and 6C).

Figure 4:
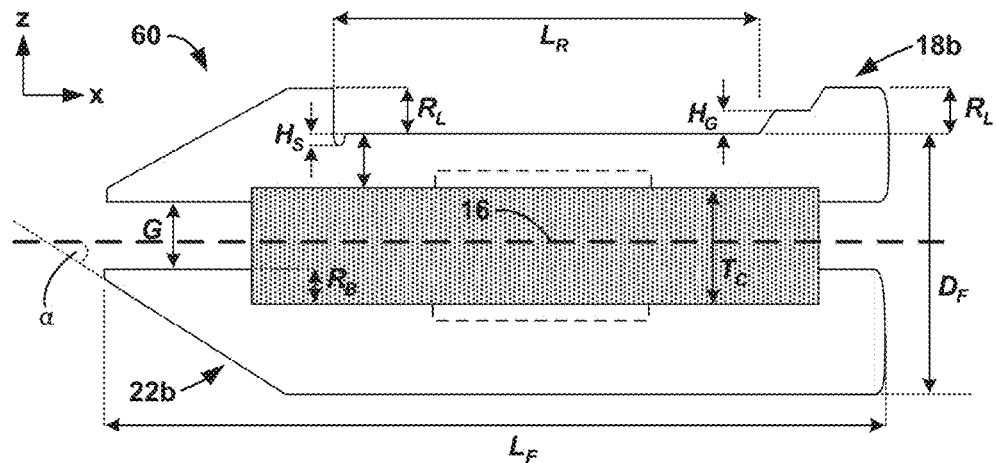
FIG. 4 is a conceptual side view schematic illustrating another example flex pin.
Figure 5:
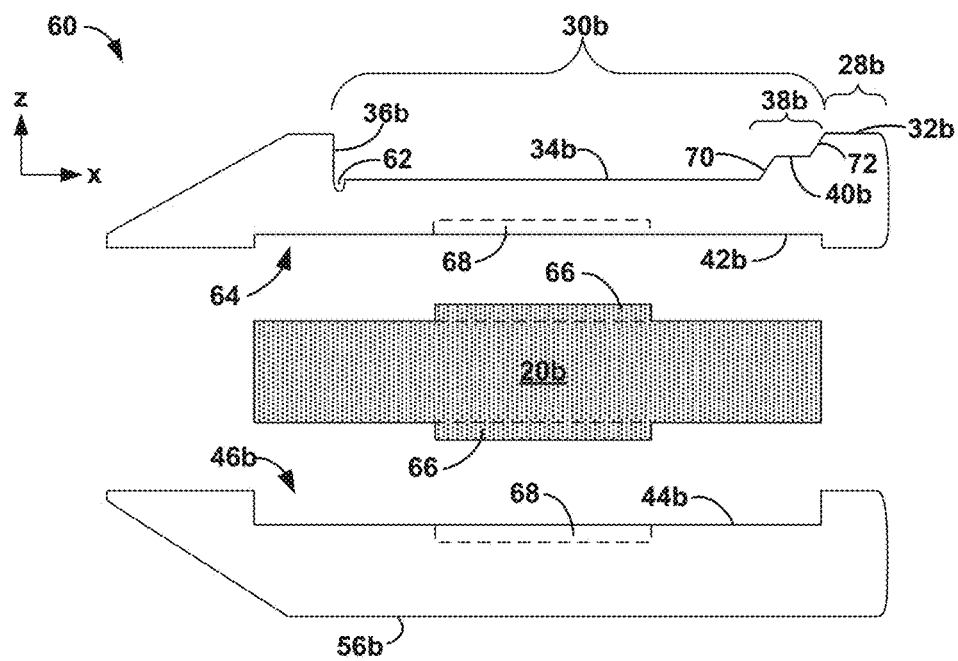
FIG. 5 is a conceptual side-exploded view schematic of the flex pin of FIG. 4.

While bonding recess 46 is depicted as being incorporated as part of second rigid member 22 of FIG. 2, in some examples bonding recess 46 may be incorporated in first rigid member 18 or both first rigid member 18 and second rigid member 22. For example, FIGS. 4 and 5 illustrate a conceptual side view (FIG. 4) and side-exploded view (FIG. 5) of another example flex pin 60. As shown in FIG. 5, flex pin 60 of includes a first bonding surface 42b that includes a first bonding recess 64 and includes a second bonding surface 44b that includes a second bonding recess 46b. In some examples, the inclusion of first bonding recess 64 and second bonding recess 46b may provide increased resistance against lateral deformation (e.g., along the x-axis of FIG. 4) of compressible member 20b, which may help inhibit flex pin 60 from becoming unintentionally dislodged from during operation of the earthmoving vehicle.

In some examples, as shown in FIGS. 4 and 5, first bonding surface 42b and second bonding surface 44b may each include one or more alignment recesses 68 configured to receive a corresponding alignment guide 66 of compressible member 20b. In some examples, the alignment guides 66 may be configured to help align and/or attach compressible member 20b to first bonding surface 42b and second bonding surface 44b during assembly of flex pin 60.

Flex pin 60 includes a locking recess 30b defined by a forward wall 36b, a locking major surface 34b, and a back gradation 38b. Forward wall 36b and locking major surface 34b may be positioned substantially perpendicular to one another (e.g., perpendicular or nearly perpendicular). In some examples, flex pin 60 further defines a slot 62 abutting and separating forward wall 36b and locking major surface 34b. The inclusion of slot 62 may help ensure that forward wall 36b maintains a substantially perpendicular contact surface (e.g., perpendicular or nearly perpendicular to central axis 16) for receiving shank 14. For example, in some examples that do not include slot 62 (e.g., flex pin 10), debris or other materials (e.g., excess cast material used to form first rigid member 18) may accumulate at the junction between forward wall 36b and locking major surface 34b. When such flex pins are installed on the earthmoving vehicle, the accumulated debris or other materials may prevent shaft 14 from properly seating or "locking" in locking recess 30b. In some examples, the accumulated debris or other materials may increase the likelihood of the flex pin becoming unintentionally dislodged from bore holes 13 during operation. The inclusion of slot 62 may help reduce the affect any accumulation of debris or other materials at the junction between forward wall 36b and locking major surface 34b may have on the desired geometry of the junction, which may help inhibit flex pin 60 from becoming unintentionally dislodged during operation.

Flex pin 60 also includes back gradation 38b including step 40b, which, in some examples, defines the approximate midpoint of back gradation 38b. In some examples, the transition of between locking major surface 34b-to-step 40b and the transition between step 40b-to-first outer surface 32b may be defined by gradient sections 70 and 72 respectively. In some examples, gradient sections 70 and 72 may be substantially perpendicular (e.g., perpendicular or nearly perpendicular) to central axis 16 (e.g., defining a 90° transition). In other examples, gradient sections 70 and 72 may be tapered (e.g., 40° to central axis 16) to allow for easier removal of flex pin 60 by, for example, allowing flex pin 60 to be removed from bore holes 13 using a press.

FIG. 4 also includes various dimensional parameters that may be used to describe flex pin 60 including for example, a flex pin length ($L_F$) that indicates a length from one end of flex pin 60 to another, a locking recess depth ($R_L$) that indicates the depth of a locking recess 30b, a bonding recess depth ($R_B$) that indicates the depth of a bonding recess defined by one of the rigid members, a tapered tip angle (α), a locking recess seat length ($L_R$) that is measured between forward wall 36b and back gradation 38b, a gradation step height ($H_G$) that indicates the z-axis distance between major surface 34b and a surface defined by step 40b, a gap distance (G) defining the separation distance between first rigid member 18b and second rigid member 22b when compressible member 20b is in a non-compressed state (e.g., as measured perpendicular to central axis 16 in the z-axis direction), a flex pin diameter ($D_F$) that defines the perpendicular (relative to central axis 16) distance between locking major surface 34b and second outer surface 56b, a slot depth ($H_S$), and a thickness for compressible member 20 ($T_C$) as measured perpendicular to central axis 16 in the z-axis direction. Although referred to as a flex pin diameter ($D_F$), flex pins described herein may not be circular in cross-section (taken perpendicular to central axis 16), such that flex pin diameter ($D_F$) may generally indicate a dimension measured in the z-axis direction of FIG. 4.

Figure 6A:
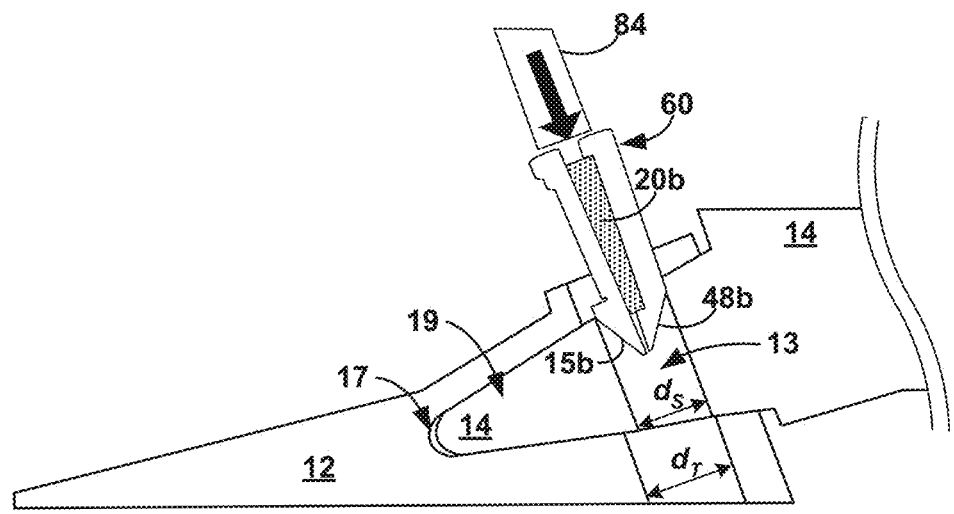
FIGS. 6A-6D are conceptual side views of another assembly illustrating an example flex pin being installed and removed from the tooth and shank assembly.

In some examples, the various dimensional parameters of flex pin 60 may be selected depending on the diameter of bore holes 13 in which flex pin 60 is installed. For example, as shown in FIG. 6A, shank 14 defines a shank bore hole having a diameter ($d_S$) measured at the portion of shank 14 received by the locking recess 30b when the flex pin 60 is installed in the "locked" position (e.g., FIGS. 1 and 6B). In some examples, tooth 14 may define a tooth bore hole having a slightly larger diameter ($d_T$) compared to the shank bore hole diameter ($d_S$). In some examples, flex pin 60 may be constructed to define a flex pin diameter ($D_F$) of about 7% to about 8% larger than the shank bore hole diameter ($d_S$) and a gap distance (G) of about 30% of the shank bore hole diameter ($d_S$). In some examples, flex pin 60 may define a locking recess depth ($R_L$) equal to about 10% of the flex pin diameter ($D_F$), a bonding recess depth ($R_B$) of about 12% of the flex pin diameter ($D_F$), a thickness for compressible member 20 ($T_C$) of about 14%, a gradation step height ($H_G$) of about half the locking recess depth ($R_L$) (e.g., step 40 defines about the midpoint of back gradation 38), and/or a slot depth ($H_S$) of about 25% of locking recess depth ($R_L$). In some examples, locking recess seat length ($L_R$) may be sized to substantially equal (e.g., equal, nearly equal, or slightly larger) to the portion of shank 14 received by locking recess 30b and the overall thickness of flex pin 60 (e.g., locking recess depth ($R_L$) plus flex pin diameter ($D_F$)) may be sized to be substantially equal (e.g., equal, nearly equal, or slightly larger) to the tooth bore hole diameter ($d_T$).

Figure 6B:
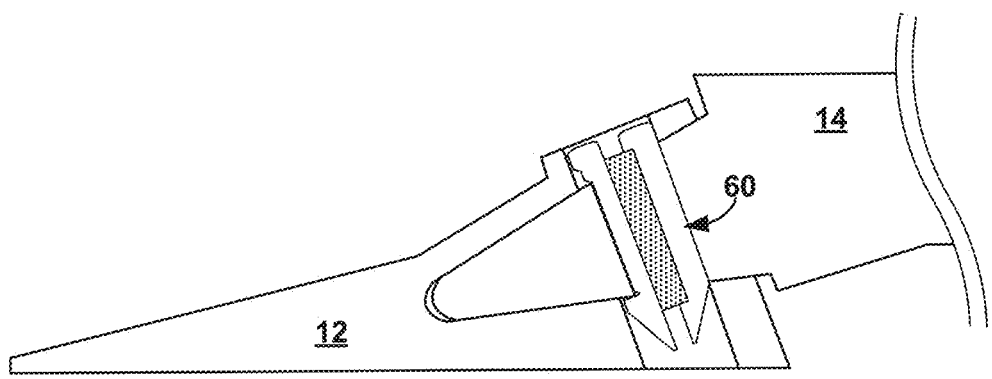

FIGS. 6A-6D illustrate a conceptual progression of a flex pin 60 being installed and removed from a tooth 12 and shank 14 assembly. For example, FIG. 6A illustrates flex pin 60 being driven into substantially aligned bore holes 13 of tooth 12 and shank 14 and FIG. 6B illustrates flex pin 60 in an installed (e.g., "locked") position within bore holes 13. As flex pin 60 is inserted, tapered tips 15b and 48b contact portions of tooth 12 and/or shank 14 and allow for the gradual compression of compressible member 20b as flex pin 60 is advanced into the "locked" position (FIG. 6B). Because tapered tips 15b and 48b define an outer dimension that increases in a direction away from tooth 12 and shank 14 as flex pin 60 is being installed in bore holes 13, tapered tips 15b and 48b may be configured to facilitate the introduction of flex pin 60 into misaligned bore holes 13, which may define a smaller opening for receiving flex pin 60. Tapered tips 15b and 48b may help align bore holes 13 of tooth and shank 14 as flex pin 60 is moved into bore holes 13 if bore holes 13 are misaligned prior to introduction of flex pin 60. Thus, in some examples, tapered tips 15b and 48b may help improve the ease with which flex pin 60 is installed into bore holes 13.

In some examples, the inclusion of tapered tips 15b and 48b may permit flex pin 60 to be installed using a press 84 (e.g., hydraulic or mechanical press). In such examples, the tapered tip angle (α) may be about 40° to allow for easier advancement of flex pin 60 into the "locked" position (FIG. 6B).

Figure 6C:
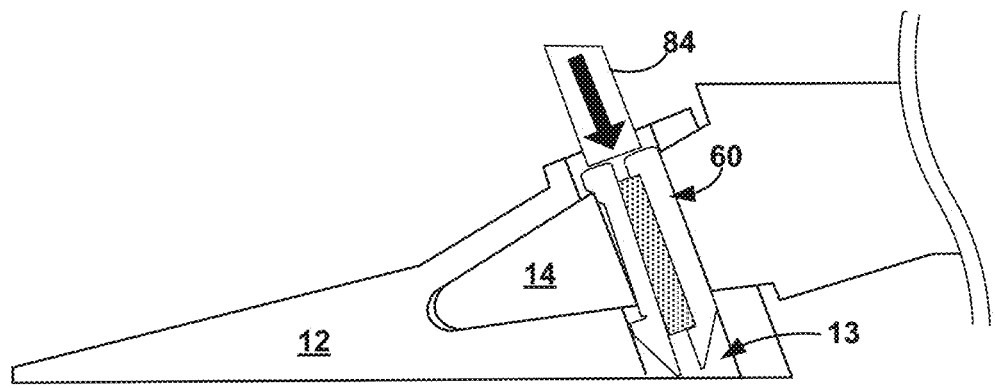
Figure 6D:
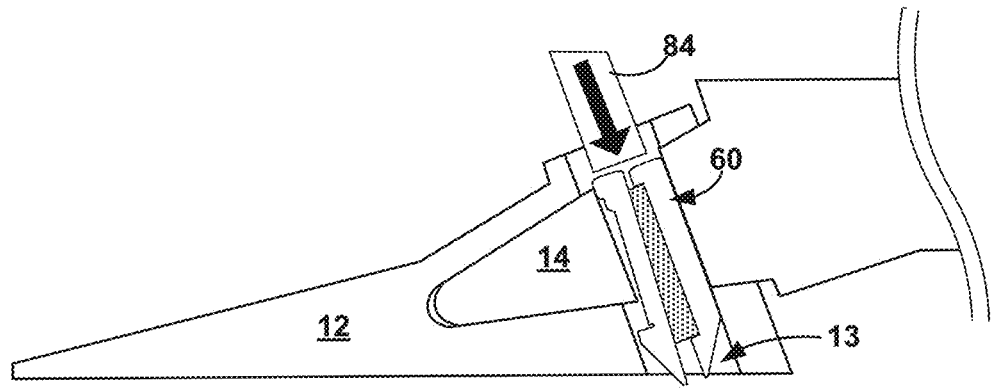

Flex pin 60 may be removed from bore holes 13 by continuing the advancement of flex pin 60 in the direction in which it was installed (FIGS. 6C and 6D). FIG. 6C shows the portion of shank 14 received by flex pin 60 being unseated from locking major surface 34b and advanced across gradient section 70 of back gradation 38b to rest upon step 40b. FIG. 6D shows the continued advancement of flex pin 60 such that the portion of shank 14 received by flex pin 60 is advanced across gradient section 72 of back gradation 38b to rest on first outer surface 32b. Because step 40b of back gradation 38b defines a smaller outer diameter of flex pin 60 compared to the outer diameter defined by at first outer surface 32b, back gradation 38b may help improve the ease in which the first back end 28b of flex pin 60 is advanced through bore holes 13 in order to remove flex pin 60 from bore holes 13. Additionally or alternatively, first step 40b of back gradation 38b may help improve the ease of removal of flex pin 60 by establishing a point of respite (e.g., FIG. 6C) before first back end 28b is completely advanced into bore holes 13 (e.g., FIG. 6D). Such examples may allow flex pin 60 to be removed in a series of incremental stages rather than be removed in a single step for example, if the back gradation were constructed as a continuous taper or a single wall perpendicular to central axis 16.

Figure 7:
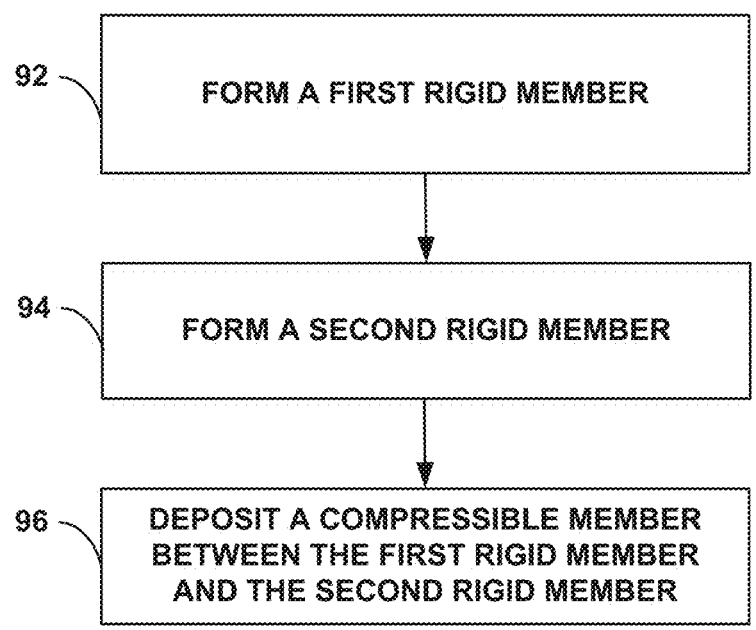
FIG. 7 is a flow diagram illustrating an example technique for forming an example flex pin.

Flex pin 60 may be formed using any suitable technique. FIG. 7 is a flow diagram illustrating an example technique for forming an example flex pin in accordance with the disclosure, such as, for example flex pin 60. While the technique shown in FIG. 7 is described with respect to flex pin 60, in other examples, the techniques may be used to form other flex pins or portions of flex pins that include different configurations or the flex pins or portions of flex pins described herein may be formed using techniques other than those described in FIG. 7.

The technique illustrated in FIG. 7 includes forming a first rigid member 18b (92). As described above, first rigid member 18b may be constructed to include a metal or metal alloy material including, for example, AISI 1045 carbon steel. First rigid member 18b may be formed using any suitable technique to define one or more of the various geometrical features described above including, for example, metal casting, machining, or the like.

The technique illustrated in FIG. 7 also includes forming a second rigid member 22b (94). Second rigid member 22b may be constructed to include a metal or metal alloy material including, for example, AISI 1045 carbon steel. Second rigid member 22b may be formed using any suitable technique to define one or more of the various geometrical features described above including, for example, metal casting, machining, or the like. In some examples, first and second rigid members 18b and 22b may be formed using the same or different techniques and may be formed from the same or different materials.

The technique illustrated in FIG. 7 includes depositing a compressible member 20b between first and second rigid members 18b and 22b (96). Compressible member 20b may include any suitable material(s) configured to permit flex pin 60 to be compressed and subsequently to return to its non-compressed state. In some examples, compressible member 20b may include one or more resilient polymer materials including, for example, specially formulated rubbers such as styrene-butadiene rubber (SBR). In some examples, compressible member 20b may be deposited between first and second rigid members 18b and 22b (96) using a rubber vulcanization process in which first and second rigid members 18b and 22b are positioned adjacent with first and second bonding surfaces 42b and 44b facing and parallel to one another in a prepared mold. A resilient rubber (e.g., SBR) may then be deposited and hardened in the adjoining space between bonding surfaces 42b and 44b. In other examples, compressible member 20b may be formed separately using a mold and connected to bonding surfaces 42b and 44b using a suitable adhesive.

EXAMPLES

Example 1

Figure 8A:
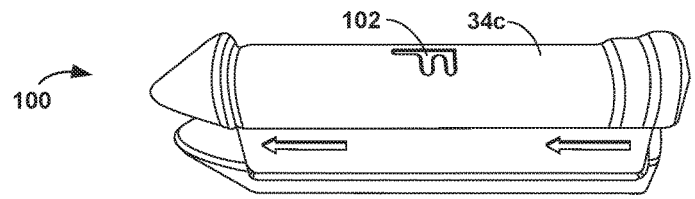
FIG. 8A is a line-drawing illustrating a perspective side-top view of an example flex pin.
Figure 8B:
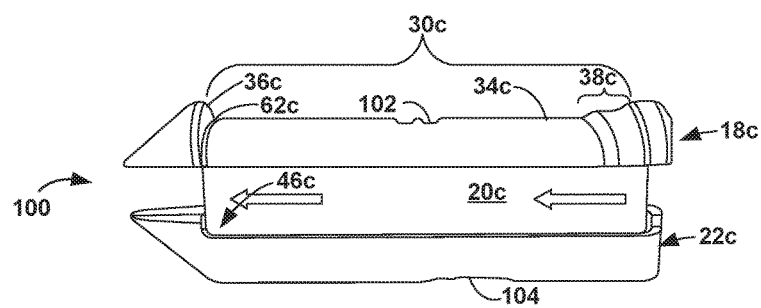
FIG. 8B is a line-drawing illustrating a perspective side view of the flex pin of FIG. 8A.

FIGS. 8A-8B are line-drawings illustrating perspective side-top (FIG. 8A) and side (FIG. 8B) views of an example flex pin 100 that includes first rigid member 18*c* that includes a locking recess 30*c* defined by a forward wall 36*c*, a slot 62*c*, a locking major surface 34*c*, and a back gradation 38*c*. Flex pin 100 also includes second rigid member 22*c* that includes a bonding recess 46*c* and a compressible member 20*c* disposed between first rigid member 18*c* and second rigid member 22*c* with part of compressible member 20*c* contained in bonding recess 46*c*. Flex pin 100 also includes directional markers 102 and 104 indicating the front (e.g., "F" 102) and rear (e.g., "R" 104) faces of flex pin 100 to assist the operator with the proper installation of flex pin 100.

Flex pin 100 was prepared by casting and forging AISI 1045 carbon steel in prepared molds that included all various geometric features of first rigid member 18*c* and second rigid member 22*c*. In a separate mold, compressible member 20*c* was prepared using specially formulated styrene-butadiene rubber (SBR) to define a substantially rectangular shape having alignment guides (not shown) configured to communicate with alignment recesses included in both first rigid member 18*c* and second rigid member 22*c* (not shown). Flex pin 100 was assembled using a primer and adhesive to attach compressible member 20*c* to the respective bonding surfaces of both first rigid member 18*c* and second rigid member 22*c*.

The various dimensional parameters of flex pin 100 were selected to be installed in a vertical pin hole type of bucket tooth set and are provided in Table 1 below.

TABLE 1

Dimensional Parameter of Flex Pin 100

| | |
|---|---|
| Flex pin length ($L_F$) | 2.22 in. |
| Flex pin diameter ($D_F$) | 0.72 in. |
| Locking recess seat length ($L_R$) | 1.19 in. |
| Locking recess depth ($R_L$) | 0.07 in. |
| Gradation step height ($H_G$) | 0.03 in. |
| Slot depth ($H_S$) | 0.02 in. |
| Gap distance (G) | 0.21 in. |
| Tapered tip angle (α), | 36° |
| Compressible member thickness ($T_C$) | 0.32 in. |
| Bonding recess depth ($R_B$) | 0.08 in. |

Example 2

Figure 9A:
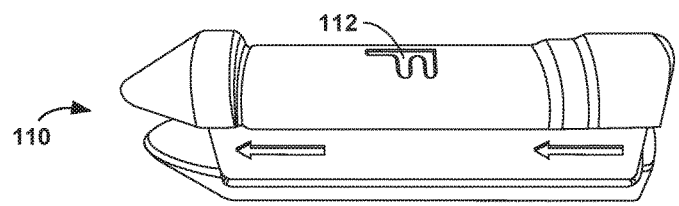
FIG. 9A is a line-drawing illustrating a perspective side-top view of an example flex pin.
Figure 9B:
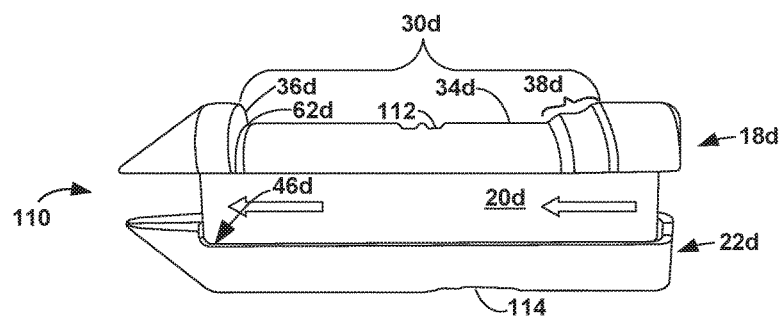
FIG. 9B is a line-drawing illustrating a perspective side view of the flex pin of FIG. 9A.

FIGS. 9A-9B are line-drawings illustrating perspective side-top (FIG. 9A) and side (FIG. 9B) views of an example flex pin 110 that includes first rigid member 18*d* that includes a locking recess 30*d* defined by a forward wall 36*d*, a slot 62*d*, a locking major surface 34*d*, and a back gradation 38*d*. Flex pin 110 also includes second rigid member 22*d* that includes a bonding recess 46*d* and a compressible member 20*d* disposed between first rigid member 18*d* and second rigid member 22*d* with part of compressible member 20*d* contained in bonding recess 46*d*. Flex pin 110 also includes directional markers 112 and 114 indicating the front (e.g., "F" 112) and rear (e.g., "R" 114) faces of flex pin 110 to assist the operator with the proper installation of flex pin 110.

Flex pin 110 was prepared by casting and forging AISI 1045 carbon steel in prepared molds that included all various geometric features of first rigid member 18*d* and second rigid member 22*d*. In a separate mold, compressible member 20*d* was prepared using specially formulated styrene-butadiene rubber (SBR) to define a substantially rectangular shape having alignment guides (not shown) configured to communicate with alignment recesses included in both first rigid member 18*d* and second rigid member 22*d* (not shown). Flex pin 110 was assembled using a primer and adhesive to attach compressible member 20*d* to the respective bonding surfaces of both first rigid member 18*d* and second rigid member 22*d*.

The various dimensional parameters of flex pin 110 were selected to be installed in a side pin hole type of bucket tooth set and are provided in Table 2 below.

TABLE 2

Dimensional Parameter of Flex Pin 110

| | |
|---|---|
| Flex pin length ($L_F$) | 2.22 in. |
| Flex pin diameter ($D_F$) | 0.72 in. |
| Locking recess seat length ($L_R$) | 1.53 in. |
| Locking recess depth ($R_L$) | 0.07 in. |
| Gradation step height ($H_G$) | 0.03 in. |
| Slot depth ($H_S$) | 0.02 in. |
| Gap distance (G) | 0.21 in. |
| Tapered tip angle (α), | 36° |
| Compressible member thickness ($T_C$) | 0.32 in. |
| Bonding recess depth ($R_B$) | 0.08 in. |

Various examples of the disclosure have been described. These and other examples are within the scope of the following claims.

What is claimed is:

1. A flex pin comprising:
a first rigid member comprising a first elongated body extending along a central axis of the flex pin from a first forward end to a first back end, wherein the first elongated body defines a first bonding surface and a locking recess, wherein the locking recess extends laterally along the first elongated body between the first forward end and the first back end, wherein the locking recess comprises a major surface substantially parallel to the central axis, a forward wall substantially perpendicular to the central axis and adjacent to the first forward end, and a back gradation having at least one step between the major surface of the locking recess and a first outer surface of the first rigid member such that the at least one step is positioned further from the first bonding surface than the major surface of the locking recess and the first outer surface is positioned further from the first bonding surface than the at least one step as measured in a direction perpendicular to the central axis, wherein the first forward end defines a first tapered tip;
a second rigid member comprising a second elongated body extending along the central axis from a second forward end to a second back end, wherein the second elongated body defines a second outer surface and a second bonding surface, wherein the second forward end defines a second tapered tip; and
a compressible member disposed between the first rigid member and the second rigid member, wherein the compressible member is connected to the first bonding surface and the second bonding surface,
wherein at least one of the first bonding surface or the second bonding surface defines a bonding recess configured to receive a portion of the compressible member.

2. The flex pin of claim 1, wherein the locking recess defines a slot between the forward wall and the major surface of the locking recess.

3. The flex pin of claim 1, wherein the at least one step of the back gradation defines a step surface substantially parallel to central axis.

4. The flex pin of claim 3, wherein the step surface defines a midpoint of the back gradation.

5. The flex pin of claim 3, wherein the back gradation defines a tapered transition from the major surface of the locking recess to the step surface.

6. The flex pin of claim 1, wherein the first back end defines a first driving surface substantially perpendicular to the central axis, wherein the second back end defines a second driving surface substantially perpendicular to the central axis, and wherein the first driving surface and the second driving surface define an end of the flex pin.

7. The flex pin of claim 1, wherein the first bonding surface defines a first bonding recess configured to receive a first portion of the compressible member and the second bonding surface defines a second bonding recess configured to receive a second portion of the compressible member.

8. The flex pin of claim 1, wherein the compressible member comprises styrene-butadiene.

9. The flex pin of claim 1, wherein the first rigid member and the second rigid member comprise AISI 1045 carbon steel.

10. The flex pin of claim 1, wherein the first bonding surface is substantially parallel to the second bonding surface.

11. The flex pin of claim 1, wherein the bonding recess comprises a front retaining wall substantially perpendicular to the central axis and a rear retaining wall substantially perpendicular to the central axis, wherein the compressible member defines a rectangular shaped cross-section configured to be received between the front retaining wall and the rear retaining wall.

12. A method of forming a flex pin, the method comprising:

forming a first rigid member, wherein the first rigid member comprises a first elongated body extending along a central axis of the flex pin from a first forward end to a first back end, wherein the first elongated body defines a first bonding surface and a locking recess, wherein the locking recess extends laterally along the first elongated body between the first forward end and the first back end, wherein the locking recess comprises a major surface substantially parallel to the central axis, a forward wall substantially perpendicular to the central axis and adjacent to the first forward end, and a back gradation having at least one step between the major surface of the locking recess and a first outer surface of the first rigid member such that the at least one step is positioned further from the first bonding surface than the major surface of the locking recess and the first outer surface is positioned further from the first bonding surface than the at least one step as measured in a direction perpendicular to the central axis, wherein the first forward end defines a first tapered tip;

forming a second rigid member, wherein the second rigid member comprises a second elongated body extending along the central axis from a second forward end to a second back end, wherein the second elongated body defines a second outer surface and a second bonding surface, wherein the second forward end defines a second tapered tip; and depositing a compressible member between the first rigid member and the second rigid member, wherein depositing the compressible member comprises depositing a portion of the compressible member into a bonding recess defined by at least one of the first bonding surface or the second bonding surface, wherein the compressible member is connected to the first bonding surface and the second bonding surface.

13. The method of claim 12, wherein forming the first rigid member comprises casting a molten metal to form the first rigid member.

14. The method of claim 12, wherein depositing the compressible member between the first rigid member and the second rigid member comprises:

forming the compressible member using a mold, wherein the compressible member comprises styrene-butadiene; and adhering the compressible member to the first bonding surface and the second bonding surface using an adhesive.

15. The method of claim 12, wherein the locking recess defines a slot between the forward wall and the major surface of the locking recess.

16. The method of claim 12, wherein the at least one step of the back gradation defines a step surface substantially parallel to central axis.

17. The method of claim 16, wherein the back gradation defines a tapered transition from the major surface of the locking recess to the step surface.

18. The method of claim 12, wherein the first back end defines a first driving surface substantially perpendicular to the central axis, wherein the second back end defines a second driving surface substantially perpendicular to the central axis, and wherein the first driving surface and the second driving surface define an end of the flex pin.

19. The method of claim 12, wherein the first bonding surface comprises a first bonding recess configured to receive a first portion of the compressible member and the second bonding surface defines a second bonding recess configured to receive a second portion of the compressible member.

20. The method of claim 12, wherein the first rigid member and the second rigid member comprise AISI 1045 carbon steel.

* * * * *